US011014843B2

(12) United States Patent
Armstrong

(10) Patent No.: US 11,014,843 B2
(45) Date of Patent: May 25, 2021

(54) FIELD REMOTE SENSING SYSTEM FOR REAL-TIME QUANTIFICATION OF TOTAL SUSPENDED SOLIDS (TSS) IN SURFACE WATERS FROM ABOVE-WATER SPECTRAL MEASUREMENTS

(71) Applicant: Roy Armstrong, Lajas, PR (US)

(72) Inventor: Roy Armstrong, Lajas, PR (US)

( * ) Notice: Subject to any disclaimer, the term of this patent is extended or adjusted under 35 U.S.C. 154(b) by 131 days.

(21) Appl. No.: 15/937,249

(22) Filed: Mar. 27, 2018

(65) Prior Publication Data

US 2019/0300412 A1 Oct. 3, 2019

(51) Int. Cl.
| | | |
|---|---|---|
| *G01S 19/01* | (2010.01) | |
| *G01J 3/42* | (2006.01) | |
| *G01J 3/433* | (2006.01) | |
| *C02F 9/00* | (2006.01) | |
| *G06F 3/041* | (2006.01) | |
| *H04W 72/12* | (2009.01) | |

(52) U.S. Cl.
CPC ............... *C02F 9/005* (2013.01); *G01J 3/42* (2013.01); *G01J 3/433* (2013.01); *G01S 19/01* (2013.01); *G06F 3/041* (2013.01); *H04W 72/1284* (2013.01); *C02F 2209/10* (2013.01); *C02F 2209/105* (2013.01); *C02F 2209/11* (2013.01); *C02F 2209/21* (2013.01)

(58) Field of Classification Search
None
See application file for complete search history.

(56) References Cited

U.S. PATENT DOCUMENTS

| | | | | |
|---|---|---|---|---|
| 6,359,689 B1* | 3/2002 | Stansell | ............... | G01N 21/253 356/246 |
| 2002/0148719 A1* | 10/2002 | Adam | ...................... | B01D 3/42 203/10 |
| 2003/0150992 A1* | 8/2003 | Chavez, Jr. | ............ | G01N 21/31 250/339.05 |
| 2003/0216949 A1* | 11/2003 | Kram | ..................... | G06Q 50/00 705/5 |
| 2007/0138401 A1* | 6/2007 | Tokhtuev | .............. | G01J 3/0283 250/373 |
| 2014/0176940 A1* | 6/2014 | Fishbine | ............... | G01J 3/0218 356/301 |

FOREIGN PATENT DOCUMENTS

WO WO-2016125164 A2 * 8/2016 ............ G01J 3/0291

OTHER PUBLICATIONS

"Hyperspectral Sensing for Turbid Water Quality Monitoring in Freshwater Rivers . . .", Wu et al., Sensors, 2014, vol. 14, p. 22670-22688 (Year: 2014).*
Chen et al. Derivative Reflectance Spectroscopy to Estimate Suspended Sediment Concentration, Remote Sens. Environ. 40. 67-77, 1992 (Year: 1992).*

* cited by examiner

*Primary Examiner* — Neil N Turk
(74) *Attorney, Agent, or Firm* — Eugenio J. Torres-Oyola; Victor M. Rodriguez-Reyes; Rafael Rodriguez-Muriel

(57) ABSTRACT

A portable remote sensing system for real-time assessments of total suspended solids (TSS) in surface waters using above-water hyperspectral measurements. The system combines a miniature high signal-to-noise ratio spectrometer coupled to a credit card-size computer, lens, rechargeable battery, GPS, display panel, and dedicated software to derive TSS from above-water spectral measurements.

12 Claims, 5 Drawing Sheets

FIELD REMOTE SENSING SYSTEM FOR REAL-TIME QUANTIFICATION OF TOTAL SUSPENDED SOLIDS (TSS) IN SURFACE WATERS FROM ABOVE-WATER SPECTRAL MEASUREMENTS

BACKGROUND OF THE INVENTION

Water quality impacts both human health and socioeconomic development. Inland water quality monitoring of sediment loads is required for providing safe water for human consumption and as an indicator of the health of aquatic ecosystems. There is a current need for a rapid and cost-effective method and/or system for assessing water quality indicators such as total suspended solids (TSS) in lakes, streams, reservoirs and coastal waters. Traditional monitoring methods for water quality depend on field sampling and time-consuming laboratory analyses that cannot provide real-time results. Existing field sensors for the estimation of turbidity are expensive, hard to use, require technical expertise, frequent calibration in the laboratory using standards, and can only operate submerged. For example, existing field instruments for estimating TSS, such as the ones described in U.S. Pat. Nos. 4,890,484, 5,032,794, 5,790,471, 9,448,152 and 9,493,370 are hard to use, require technical expertise, frequent calibration in the laboratory using standards, and can only operate submerged.

Furthermore, there is a need for a method and/or system that provides considerable savings to end-users (e.g., scientists, researchers) by 1) eliminating the need for laboratory facilities and instrumentation required in the traditional analysis of TSS; 2) reducing the amount of time (person-hours) in the field and laboratory; and 3) eliminating the need for trained technicians, frequent equipment calibration, laboratory supplies, and standards required when using existing field sensors that measure turbidity.

As such, there is a need to provide a field remote sensing system for real-time quantification of total suspended solids in surface waters from above-water spectral measurements that allows end-users to obtain accurate data in real time.

SUMMARY OF THE INVENTION

The field remote sensing system (RSS), as disclosed herein, is a portable and easy to use instrument for real-time assessments of TSS in natural waters. More specifically, the RSS provides above-water, real-time quantitative assessments of an important water quality parameter, TSS, in natural waters. Furthermore, the unit is the size of a single lens reflex camera and consists of a miniature spectrometer coupled to a credit card-sized computer, lens, rechargeable battery, GPS, motion sensor, and dedicated operating software to derive TSS from above-water hyperspectral measurements.

As previously noted, traditional monitoring methods for water quality depend on field sampling and time-consuming laboratory analyses that cannot provide real-time results. Existing field instruments for the estimation of TSS are expensive, hard to use, require technical expertise, frequent calibration in the laboratory using standards, and can only operate submerged. What these instruments measure is turbidity, expressed as Nephelometric Turbidity Units or Formazin Nephelometric Units, and use site-specific correlations to total suspended solids making these estimates unique for each location or situation.

What makes the present field remote sensing system unique is its operation from above the water surface to provide real-time TSS data without any processing or technical expertise by the user. There are no existing field radiometers or spectroradiometers capable of providing instant, quantitative TSS data. This portable, easy to use, and inexpensive field remote sensing system combines a miniature high signal-to-noise ratio spectrometer coupled to a credit card-size computer (such as a Raspberry-Pi), lens, rechargeable battery, GPS, motion sensor, display panel, and dedicated software to derive TSS from above-water hyperspectral measurements. The system is simple to use (point and shoot) with data logging and instant readout of the TSS value along with location coordinates and time/date information. It uses one or more empirically derived algorithms to derive TSS from above-water spectral measurements. The measurement protocol requires measuring the water upwelling light signal (Lu) at 45 degrees from above the water surface (i.e., from nadir), followed by a measurement of downwelling light signal (Ed) from a standard grey (18% reflectance) card from above. It uses these measurements to calculate the remote sensing reflectance, which is used by the spectroscopy-based algorithms to calculate TSS. The TSS and ancillary data are displayed real-time and also logged in a micro SD card for later downloading.

The algorithms for estimating TSS disclosed herein, utilize derivative analysis to separate the TSS signal from the confounding effects of water surface reflections, variable illumination and other water constituents such as chlorophyll and colored dissolved organic matter. An embodiment of the present disclosure will be designed to be used for monitoring remote and inaccessible areas from small drones, providing data over many stations at high spatial resolution (cm scale) and high temporal frequency (daily, hourly or more frequent). This is impossible or impractical to do with the existing submerged sensor technology for water quality parameters.

DETAILED DESCRIPTION OF THE INVENTION

In the following description, a portable remote sensing system ("RSS") unit for real-time assessments of total suspended solids ("TSS") in surface waters using above-water hyperspectral measurements is provided. The RSS unit provides TSS values in real-time, without the cumbersome and time-consuming traditional laboratory methodology or the expensive and difficult to use existing in situ sensor technology. It should be noted that the RSS unit is not limited to assessing TSS in surface waters; it can also be used to detect and quantify other parameters of water quality such as chlorophyll, colored dissolved organic matter ("CDOM"), blue-green algae, etc.

The system combines a miniature high signal-to-noise ratio spectrometer coupled to a credit card-size computer, lens, rechargeable battery, GPS, display panel, motion sensor and dedicated software to derive TSS from above-water spectral measurements. The operating and analysis software incorporates one or more empirically derived proprietary algorithms that use above-water reflectance measurements and spectral analysis to derive real-time TSS estimates over a wide range of values typically found in natural waters. The operation of the system utilizes a simple measurement protocol consisting of measuring the upwelling light signal (Lu) from above the water surface at 45 degrees from nadir; and then measuring the downwelling light signal (Ed) by looking directly down at a commercially available standard calibrated (18% reflectance) reference card.

More specifically, the field RSS unit uses robust algorithms for estimating turbidity under a wide range of concentrations and environmental conditions. This is achieved using derivative analysis to deconvolve (spectrally separate) the hyperspectral signal into TSS concentration from the confounding effects of water surface reflections, variable illumination (including cloud cover) and chlorophyll and colored dissolved organic matter (CDOM). A measurement protocol is used to minimize surface reflectance and sun glint.

A preliminary mesocosm (controlled conditions) experiment using the RSS unit showed that robust estimates of TSS could be obtained using a field spectroradiometer over the range of 0-200 mg/L using first derivative analysis.

Figure 1:
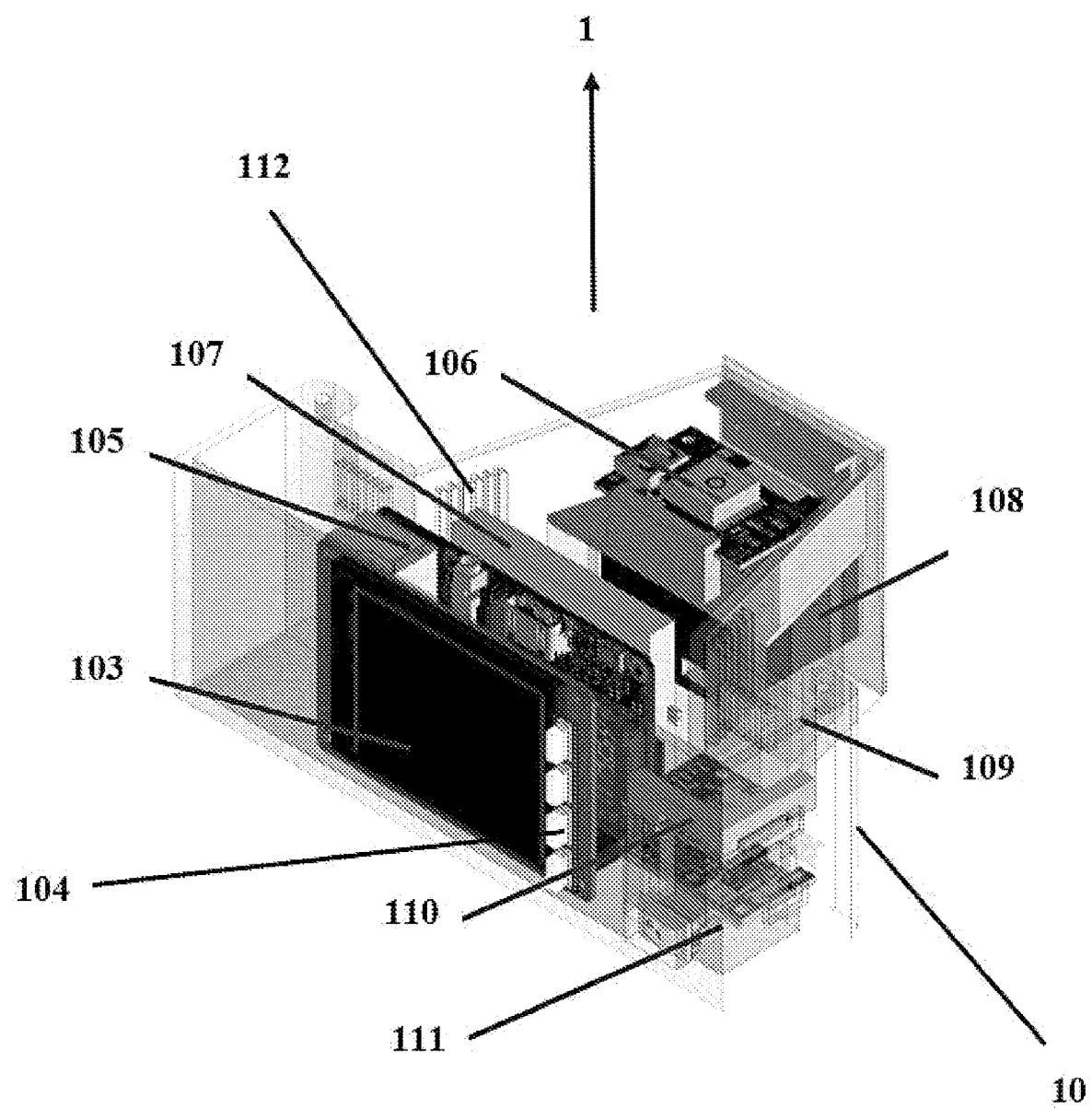
FIG. 1 is a perspective view of the back end of the field remote sensing system unit showing the components of the field remote sensing system unit.

FIG. 1 is a perspective view of the back end of the field remote sensing system showing the components of the field RSS unit 1. In particular, the field RSS unit 1 is a high signal-to-noise ratio spectrometer that comprises a frame or body 102 having a display screen 103 on the outer shell of said frame or body 102 for computer control and data output such as displaying real-time assessments of TSS in surface waters. In a preferred embodiment the display screen 103 is a touchscreen. The frame or body 102 may comprise any material that is resistant to the elements and can have any shape. Moreover, the RSS unit 1 may optionally include push buttons 104 on the outer shell of the frame or body 102 for providing commands to the RSS unit 1. Furthermore, on the inner shell of the frame or body 2, the RSS unit 1 further comprises at least one credit card-size embedded computer 105 (such as a Raspberry-Pi) for operation and processing of the spectral data, wherein the at least one embedded computer is coupled to at least one global positioning system ("GPS") receiver 106 for providing geolocation data such as elevation, latitude and longitude; at least one battery pack 107, at least one spectrometer 108, at least one motion sensor 109 for providing absolute orientation that may include 3× accelerometers, magnetometers and gyroscopes, at least one micro SD card 110 to export the data, and to at least one power controller/charger 111. It should be noted that the at least one embedded computer 105 includes at least one processor and at least one memory. Furthermore, the aforementioned components may be interconnected with each other or to only some of the components of the RSS unit 1. Additionally, the at least one battery pack 107 of the RSS unit 1 may be disposable or rechargeable. Also, the outer shell of the frame or body 102 may optionally include at least one opening and/or at least one lid/cover 301— which may be hinged or removably attached to the frame or body 102—for gaining access to the inner shell where most of the aforementioned components of the RSS unit 1 are located. Lastly, it should be noted that the RSS unit 1 may include one or more vent-holes 112 to avoid excessive heating of the components located on the inner shell.

In a preferred embodiment, the RSS unit 1 is operated through a smartphone or tablet. Communications between the RSS unit 1 and the smart device will be through a communications port, such as via Bluetooth™, Wi-Fi, Universal Serial Bus (USB™) cable, infrared, or any other data transmission system now known or later known. In this example a smart device application is used for control, data processing and display of the water quality data which includes, but is not limited to, TSS.

In another preferred embodiment a dual spectrometer version of the of the RSS unit 1 can be used onboard unmanned aerial systems (UAS or drones). In this example the RSS unit 1 will simultaneously measure the upwelling spectral signal (Lu) while pointing at nadir using one spectrometer while simultaneously measuring the downwelling irradiance signal (Ed) with an attached cosine collector at the end of a fiber optic cable, using the second spectrometer. Furthermore, in another embodiment, the dual spectrometer version of the RSS unit 1 is used autonomously in monitoring stations. In this example the data is stored in a removable micro SD card and is also capable of real-time transmission by radio, cellular, or satellite uplink. A small solar panel can be included for charging the battery.

Additional algorithms for all embodiments of the RSS unit 1 are included for measuring chlorophyll-a, colored dissolved organic matter (CDOM), turbidity (in nephelometric turbidity unit, NTU), the attenuation coefficients of light at 490 nm and of photosynthetically-active radiation (Kd 490 and Kd PAR, respectively, and cyanobacteria (blue-green algae), among other water quality parameters.

Figure 2:
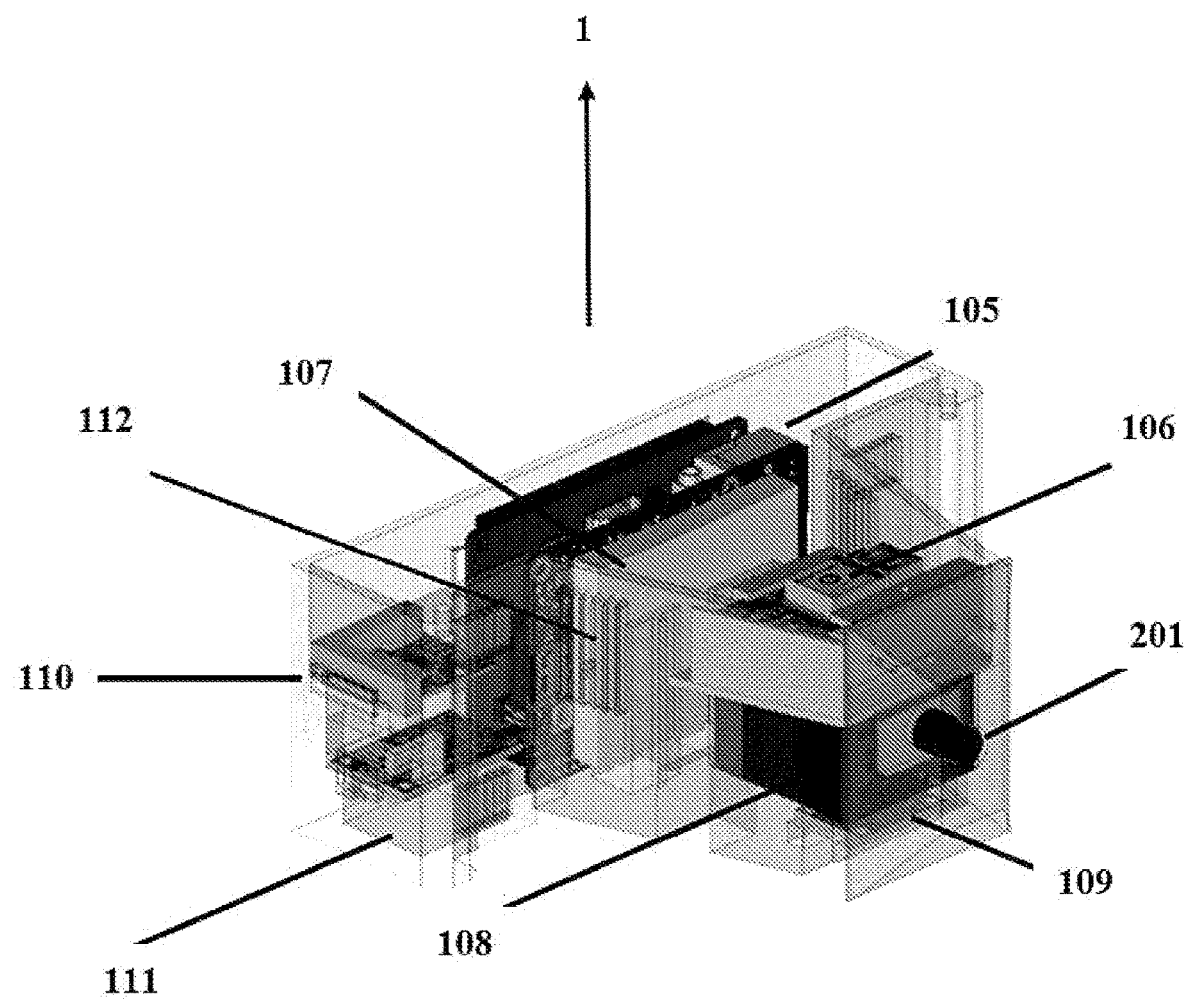
FIG. 2 is a perspective view of the front end of the field remote sensing system unit showing the components of the field remote sensing system unit.
Figure 3:
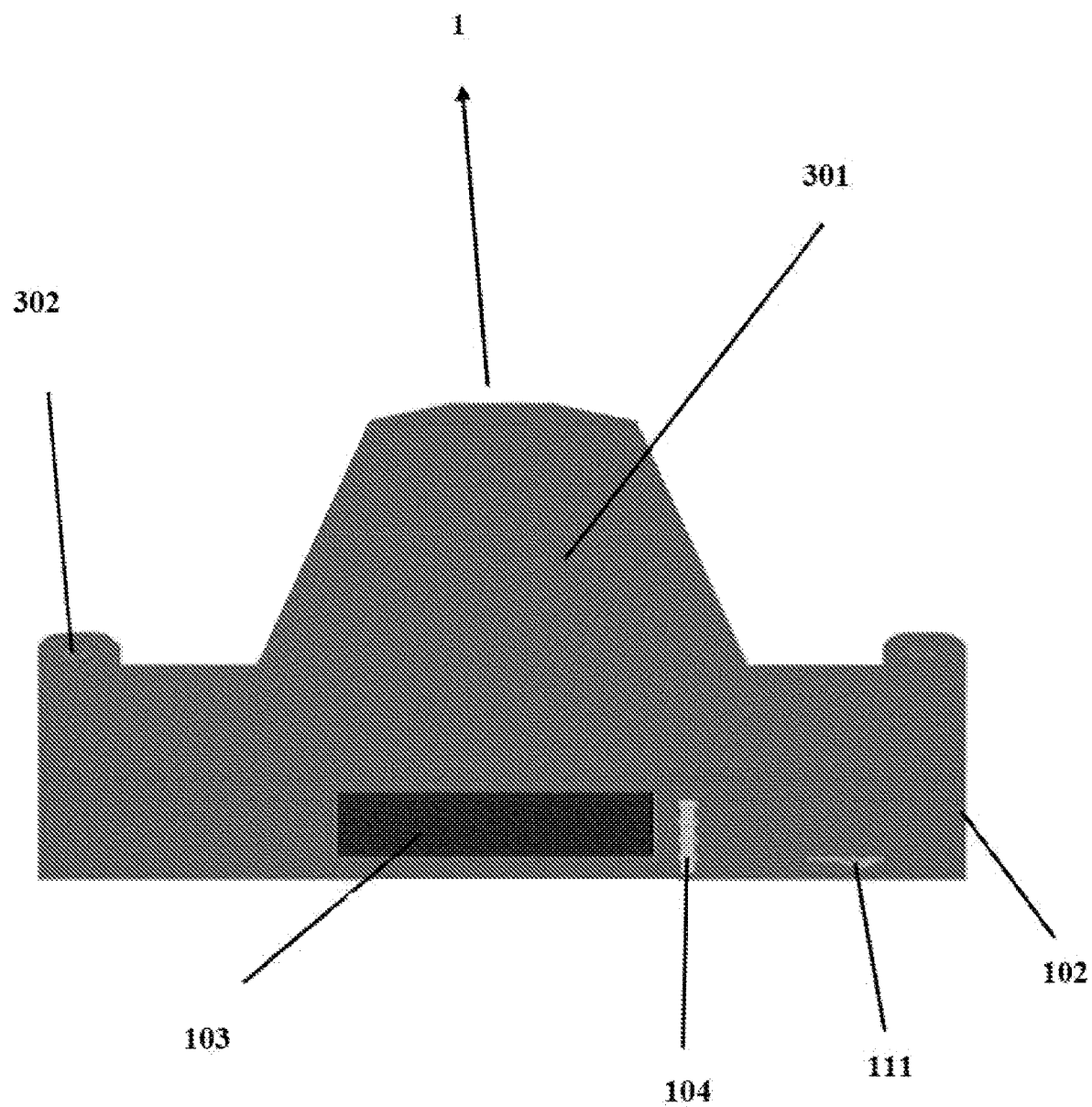
FIG. 3 is a perspective view of the top end of the field remote sensing system unit showing the outer shell of the field remote sensing system unit.

FIG. 2 is a perspective view of the front end of the field RSS unit 1 showing the components discussed in FIG. 1 of the field remote sensing system. Additionally, FIG. 2 shows that the RSS unit 1 also comprises a lens 201 on the outer shell of the frame or body 102 and coupled to the spectrometer 108. In another embodiment of the filed RSS unit 1 the lens 201 may be located on the inner shell of the frame or body 102 or having a portion of the lens 201 inside and another portion outside of the frame or body 102. FIG. 3 is a top view of the field RSS 1 unit showing the top of the outer shell of the frame or body 102. In particular, FIG. 3 shows that the at least one lid/cover 301 is attached to the RSS unit 1 through one or more attachments means 302 such as screws or any other fastening mechanism.

Figure 4:
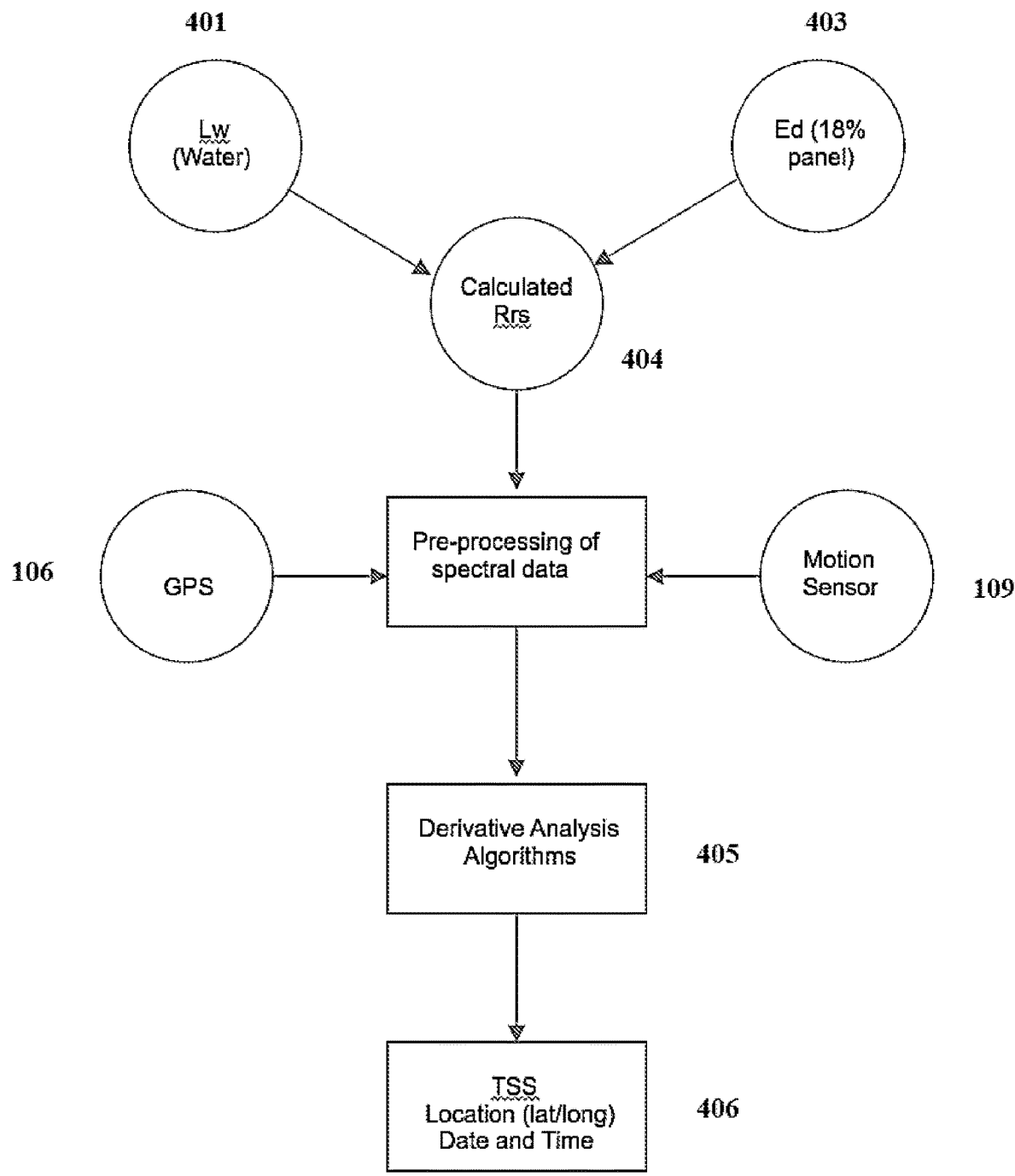
FIG. 4 is a flowchart showing the measurement protocol used by the field remote sensing system unit.

FIG. 4 is a flowchart showing the measurement protocol used by the field RSS unit 1. In particular, FIG. 4 shows the measurement protocol steps are: 1) measuring the upwelling light signal at 45 degrees from above the water surface (Lu) 401; and 2) a standard grey (18% reflectance) card measurement of downwelling irradiance (Ed) 403. These spectral scans are used to calculate remote sensing reflectance (Rrs) 404. The motion sensor 109 indicates the correct angle on the touch screen for obtaining Lu. Time, date and location stamps are added to the spectral data, which is processed by empirically derived, proprietary algorithms 405 based on first and higher-order derivative spectroscopy analysis to derive real-time turbidity, as TSS quantitative values along with date/time and location (latitude and longitude) 406.

The RSS unit 1 is uses natural sunlight, as the light source, over water bodies to measure the upwelling light signal (Lu) at right angles to the solar plane and at 45 degrees from nadir. This geometry is used to minimize the effects of sun glint, when present, and any reflection or shadow from the boat or other platform used. The motion sensor indicates the correct angle on the display screen 103 for obtaining the Lu measurement. This is followed by a standard grey card (18%) reference reflectance measurement with the RSS unit 1 pointing straight down at the card. The spectrometer operation is controlled by the credit card-size embedded computer 105, which also adds the GPS receiver's 106 coordinates and motion sensor 109 data to the data stream. The software calculates the remote sensing reflectance, which is used as input for the empirically derived, proprietary algorithms based on first order derivative analysis to calculate real-time turbidity in TSS as well as other water quality parameters such as NTU.

Figure 5:
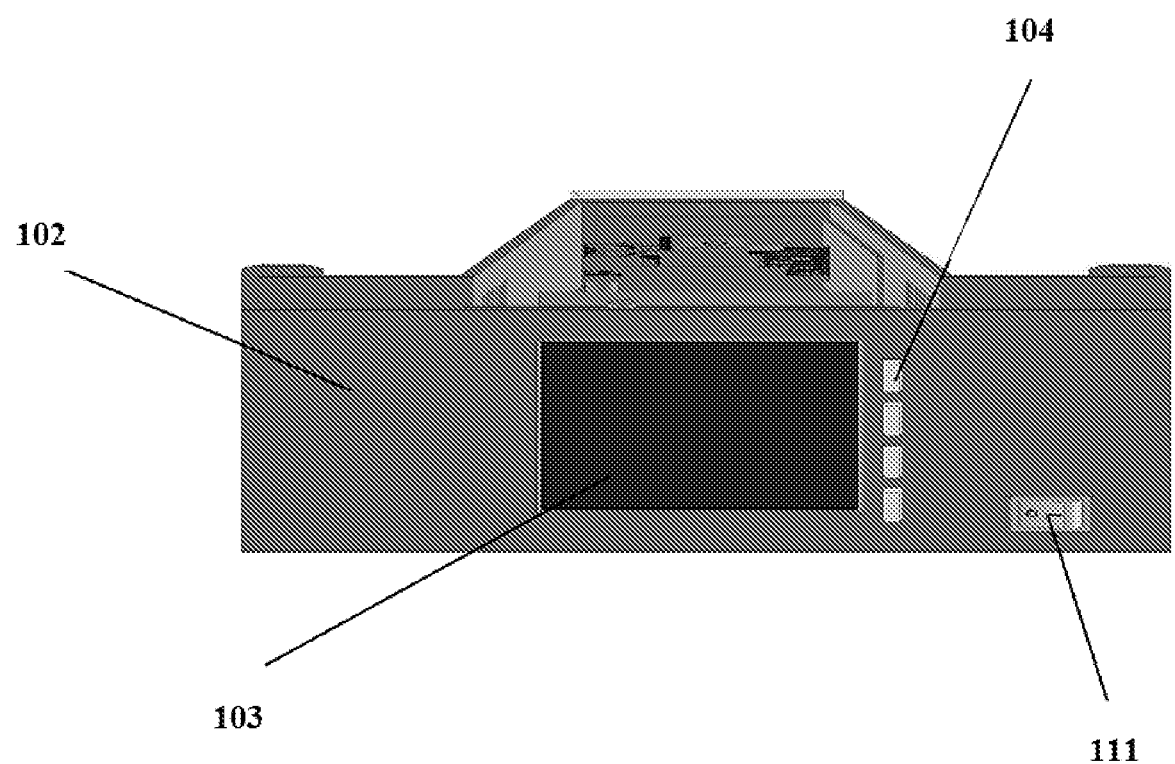
FIG. 5 shows a perspective view of the back end of the field remote sensing system unit showing the display screen of the field remote sensing system unit.

FIG. 5 shows a perspective view of the back end of the field RSS unit 1 showing the display screen 103 and push buttons 104 on the outer shell of the frame or body 102 for providing commands to the RSS unit 1 as well as showing the power controller/charger 111. Furthermore, FIG. 5 shows the top of the RSS unit 1 with the at least one lid/cover 301 removed.

Although certain exemplary embodiments and methods have been described in some detail, for clarity of understanding and by way of example, it will be apparent from the foregoing disclosure to those skilled in the art that variations, modifications, changes, and adaptations of such embodiments and methods may be made without departing from the true spirit and scope of the claims. Therefore, the above description should not be taken as limiting the scope of the invention which is defined by the appended claims The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means plus function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

What is claimed is:

1. A remote sensing kit for obtaining a real-time assessment of total suspended solids in surface waters, comprising:
a standard calibrated 18% reflectance reference card; and
a remote sensing unit having a frame that includes a front end, a back end, a top end and a bottom end;
wherein, stored within the frame, the remote sensing unit comprises at least one embedded computer that is functionally connected to:
a display screen;
wherein the display screen is visible on the back end of the frame;
a global positioning system ("GPS") for providing location coordinates;
a micro SD card for storing data;
a motion sensor;
at least one battery pack;
at least one miniature spectrometer; and
wherein the at least one miniature spectrometer includes a lens integrated therewith and provided on the front end of the frame, thereby enabling the lens to capture light signals leaving the surface of a body of water;
wherein the at least one embedded computer includes a non-transitory memory that comprises program instructions stored thereon, which when executed by a processor cause the remote sensing unit to perform the following steps:
sensing, via the motion sensor, that the lens of the remote sensing unit is being pointed at a 45-degree angle in relation to the surface of the body of water and displaying on the display screen that the remote sensing unit is being pointed at the 45-degree angle;
making at least two captures, via the lens, of an upwelling light signal (Lu) leaving the surface of the body of water at the 45-degree angle indicted by the motion sensor;
making at least two measurements, via the miniature spectrometer, of the upwelling light signal (Lu);
making at least two captures, via the lens, of a downwelling light signal (Ed) reflected at a 90-degree angle from the standard calibrated 18% reflectance reference card;
making at least two measurements, via the miniature spectrometer, of the downwelling light signal (Ed) reflected from the standard calibrated 18% reflectance reference card to obtain a calibrated measurement;
obtaining a field remote sensing reflectance spectral curve using the upwelling light signal Lu and the downwelling light signal Ed;
obtaining a number of total suspended solids (TSS) in the body of water, in real-time, by selecting a value in the spectral curve corresponding to TSS values stored in a look up table in the memory, wherein the look up table comprises a previously determined correlation between TSS and a spectral curves developed using upwelling light signals and downwelling light signals; and
displaying the number of TSS on the display screen; and
storing the obtained number of TSS in the micro SD card.

2. The remote sensing kit of claim 1, wherein the display screen comprises a touch screen.

3. The remote sensing kit of claim 1, further comprising one or more push buttons on the frame.

4. The remote sensing kit of claim 1, wherein the battery pack is rechargeable.

5. The remote sensing kit of claim 1, wherein the battery pack is disposable.

6. The remote sensing kit of claim 1, wherein the frame further includes at least one lid.

7. The remote sensing kit of claim 6, wherein the lid is removably attached to the frame.

8. The remote sensing kit of claim 6, wherein the lid is hinged to the frame.

9. The remote sensing kit of claim 6, wherein the lid is attached to the frame through one or more attachments means.

10. The remote sensing kit of claim 9, wherein the one or more attachments means include screws or fasteners.

11. The remote sensing kit of claim 1, wherein the frame further comprises vent-holes.

12. The remote sensing kit of claim 1, wherein the number of TSS stored in said micro SD card is transmitted by radio, cellular, or satellite uplink.

* * * * *